US009641453B2

(12) United States Patent
Jacoby et al.

(10) Patent No.: US 9,641,453 B2
(45) Date of Patent: May 2, 2017

(54) METHOD FOR PRIORITIZING THROUGHPUT FOR NETWORK SHARES

(71) Applicant: Dell Products, LP, Round Rock, TX (US)

(72) Inventors: Robert B. Jacoby, Merimack, NH (US); Praveen S. Lalgoudar, Bangalore, IN (US)

(73) Assignee: Dell Products, LP, Round Rock, TX (US)

( * ) Notice: Subject to any disclaimer, the term of this patent is extended or adjusted under 35 U.S.C. 154(b) by 296 days.

(21) Appl. No.: 14/534,313

(22) Filed: Nov. 6, 2014

(65) Prior Publication Data

US 2016/0134561 A1    May 12, 2016

(51) Int. Cl.
*H04L 29/06*    (2006.01)
*H04L 29/08*    (2006.01)
*H04L 12/927*    (2013.01)

(52) U.S. Cl.
CPC .......... *H04L 47/805* (2013.01); *H04L 67/322* (2013.01); *H04L 67/1097* (2013.01)

(58) Field of Classification Search
USPC ............... 709/223, 219, 201, 205, 224, 203
See application file for complete search history.

(56) References Cited

U.S. PATENT DOCUMENTS

| | | | |
|---|---|---|---|
| 7,428,624 B2 | 9/2008 | Fujita et al. | |
| 8,095,675 B2 | 1/2012 | Tripathi et al. | |
| 8,166,257 B1 * | 4/2012 | Holl, II | G06F 13/28 711/114 |
| 8,264,978 B1 * | 9/2012 | Srinivas | H04L 43/028 370/252 |
| 8,473,566 B1 * | 6/2013 | Cardente | G06F 3/061 370/252 |
| 8,793,334 B1 * | 7/2014 | Bathija | H04L 67/1097 707/821 |

(Continued)

OTHER PUBLICATIONS

Dell NetVault Backup & FluidFS Architecture, Apr. 2013. Retrieved from Internet URL: http://software.dell.com/documents/netvault-backup--dell-fluidfs-architecture-datasheet-19608.pdf.

(Continued)

*Primary Examiner* — Jude Jean Gilles
(74) *Attorney, Agent, or Firm* — Hamilton, Brook, Smith & Reynolds, P.C.

(57) ABSTRACT

Some embodiments are directed to a method, corresponding system, and corresponding apparatus for handling Quality of Service (QoS) for one or more network file shares associated with one or more Network Attached Storage (NAS) servers. Some embodiments may determine an actual value for a QoS parameter for network file shares, through a benchmark test procedure. Some embodiments may assign a QoS policy to the network file shares. Some embodiments may associate the QoS policy with the QoS parameter. Some embodiments may control the QoS policy at the NAS servers. Some embodiments may determine a current speed capability of one or more network interface controllers (NICs) associated with the NAS servers. Some embodiments may also compare the current speed capability of the NICs to the given actual value for the given QoS parameter resulting from the benchmark test procedure.

17 Claims, 7 Drawing Sheets

(56) References Cited

U.S. PATENT DOCUMENTS

| | | | |
|---|---|---|---|
| 2002/0075844 A1* | 6/2002 | Hagen | H04L 63/0442 370/351 |
| 2005/0071599 A1* | 3/2005 | Modha | G06F 9/5016 711/170 |
| 2005/0089054 A1* | 4/2005 | Ciancaglini | H04L 49/3045 370/412 |
| 2008/0046610 A1 | 2/2008 | Tripathi et al. | |
| 2008/0285465 A1* | 11/2008 | Yang | H04L 41/06 370/241 |
| 2011/0107391 A1* | 5/2011 | Brown | H04L 47/20 726/1 |
| 2012/0289147 A1* | 11/2012 | Raleigh | H04L 67/2847 455/3.06 |
| 2013/0238751 A1* | 9/2013 | Raleigh | H04L 67/20 709/217 |
| 2013/0238761 A1* | 9/2013 | Raleigh | H04L 67/306 709/219 |
| 2013/0238762 A1* | 9/2013 | Raleigh | H04L 67/306 709/219 |
| 2013/0238777 A1* | 9/2013 | Raleigh | H04L 67/1097 709/223 |
| 2016/0034372 A1* | 2/2016 | Panda | G06F 11/3414 714/33 |

OTHER PUBLICATIONS $EMC^2$, Using EMC Celerra Storage with VMware vSphere and VMware Infrastructure, Version 4.0, Dec. 2010. Retrieved from Internet URL: http://www.emc.com/collateral/software/technical-documentation/h5536-vmware-esx-srvr-using-emc-celerra-stor-sys-wp.pdf.

* cited by examiner

FIG. 2B-I

| FIG. 2B-I |
| FIG. 2B-II |

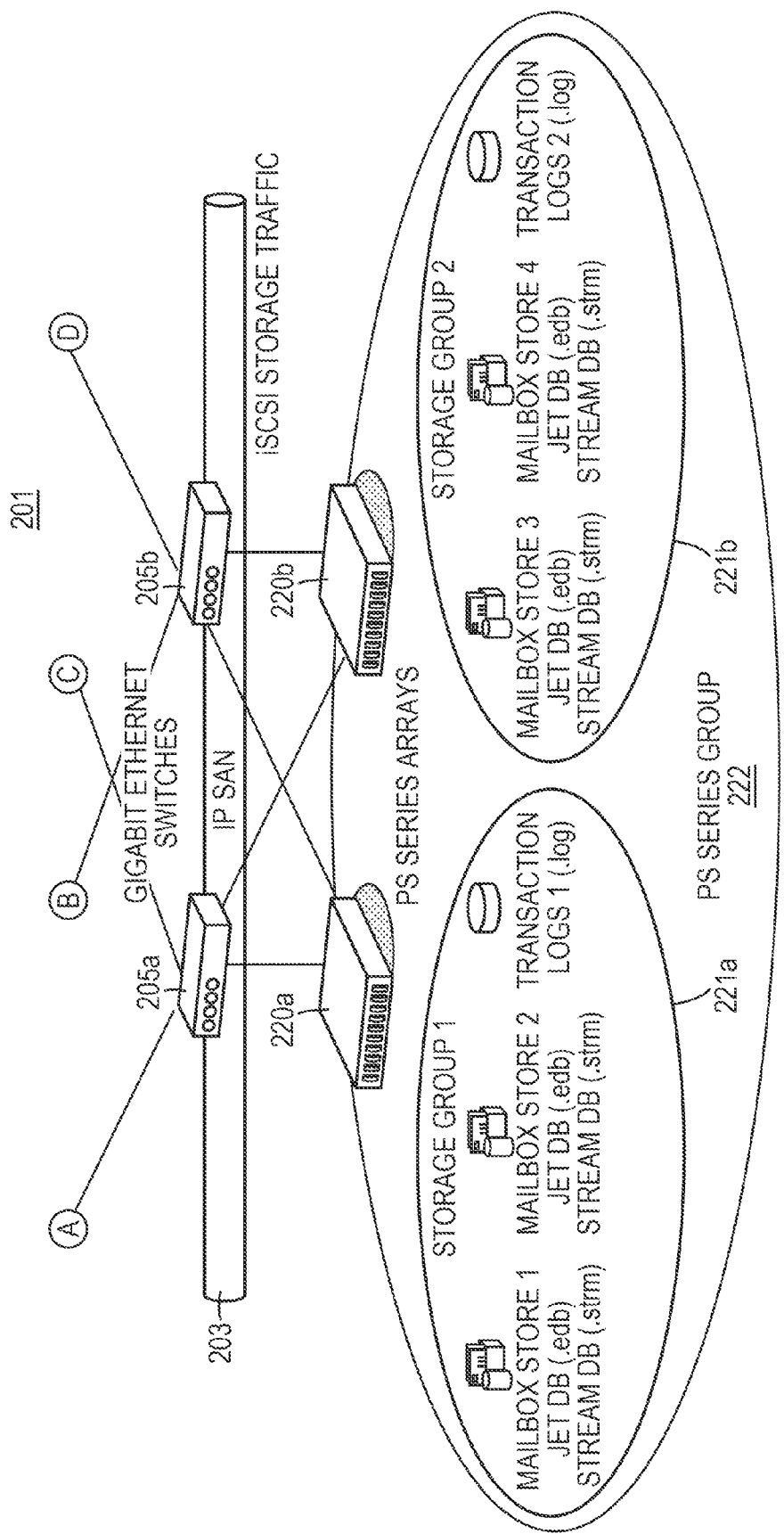
FIG. 2B-II

METHOD FOR PRIORITIZING THROUGHPUT FOR NETWORK SHARES

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The increased use of technology and computers has generated a corresponding increase in digital data. This ever-increasing digital data requires a corresponding ever-increasing amount of storage space. The need for storage space for digital data has been fueled through many changes in society. For example, home computer users' increased storage of multimedia data, especially video and photographic data, has served to increase the amount of storage space needed. Likewise, industry also requires increased storage space. As more and more business is being conducted electronically, there has been an ever-increasing demand and need for the storage of this vast amount of business data. Furthermore, there has been a demand to digitize the storage of once paper files in an attempt to decrease the overhead cost of this paper generation and storage.

With this increase of digital data, there has been a corresponding further reliance upon the integrity, required accessibility, and throughput of the digital data across the network. Across the network, a low priority network file share may consume sufficient bandwidth to adversely affect performance of a higher priority network file share. Solutions are needed to address this deficiency in performance of file shares.

Existing approaches (see U.S. Pat. No. 8,095,675, also U.S. patent application Ser. No. 11/489,934) at best specify bandwidth at a management computer, for Network Attached Storage (NAS) device volumes, by setting up Quality of Service (QoS) at a virtual machine. Other existing approaches (see U.S. Pat. No. 7,428,624, also U.S. patent application Ser. No. 11/498,135) at best disclose host systems which manage bandwidth for storage volumes.

SUMMARY OF THE DISCLOSURE

Thus, an efficient and reliable method, corresponding system, and corresponding apparatus for handling Quality of Service (QoS) for one or more network file shares is presented. Some embodiments are directed to a computer-implemented method, corresponding system, and corresponding apparatus for handling Quality of Service (QoS) for one or more network file shares associated with one or more Network Attached Storage (NAS) servers.

In some embodiments, a computer-implemented method begins by determining a given actual value for a given QoS parameter (including, but not limited to, bandwidth, throughput, transmission delay, availability, priority, access priority, protection, error rate, resilience, jitter, and/or other QoS parameters) for at least one of the one or more network file shares, through a benchmark test procedure. Some embodiments may assign a given QoS policy (including, but not limited to, a policy to modify a value of one or more of the QoS parameters, and/or another type of QoS policy) to the at least one of the one or more network file shares. Some embodiments may associate the given QoS policy with the given QoS parameter. Some embodiments may control the given QoS policy at the one or more NAS servers.

Some embodiments may determine a number of the one or more NAS servers and determine a current speed capability of one or more network interface controllers (NICs) associated with the at least one of the one or more NAS servers. Some embodiments may also perform a comparison between the current speed capability of the NICs and the given actual value for the given QoS parameter resulting from the benchmark test procedure. Some embodiments may present results of the comparison to a user.

In some embodiments, the one or more network file shares may comprise a plurality of network file shares. The given QoS policy may be assigned to the at least one of the one or more network file shares having a different priority compared with a given QoS policy assigned to at least one other of the one or more network file shares.

In some embodiments, the given QoS policy may be assigned to at least one of the one or more network file shares. The assignment may be based upon a domain name system (DNS) associated with the at least one of the one or more network file shares. In some embodiments, the given QoS policy may be assigned to at least one of the one or more network file shares. The assignment may be based upon a given Internet Protocol (IP) address associated with the at least one of the one or more network file shares.

In some embodiments, the given IP address associated with the at least one of the one or more network file shares may be different from at least one other given IP address associated with at least one other of the one or more network file shares. In some embodiments, the one or more network file shares may communicate with the one or more Network Attached Storage (NAS) servers through one or more Internet Small Computer System Interface (iSCSI) interfaces. In some embodiments, the one or more network file shares may communicate with the one or more Network Attached Storage (NAS) servers through one or more Direct-Attached Storage (DAS) interfaces.

Some embodiments include an information handling system (IHS). Some embodiments of the IHS comprise a computing module configured to associate one or more network file shares with one or more Network Attached Storage (NAS) servers. Some embodiments of the IHS may include a data module configured to determine a given actual value for a given Quality of Service (QoS) parameter for at least one of the one or more network file shares, through a benchmark test procedure. The computing module may be further configured to assign a given QoS policy to the at least one of the one or more network file shares. The computing module may be further configured to associate the given QoS policy with the given QoS parameter. The computing module may be further configured to control, at the one or more NAS servers, the given QoS policy.

In some embodiments of the IHS, the computing module may be further configured to determine a number of the one or more NAS servers. The computing module may be further configured to determine a current speed capability of one or more network interface controllers (NICs) associated with the at least one of the one or more NAS servers. The computing module may be further configured to perform a comparison between the current speed capability of the NICs and the given actual value for the given QoS parameter resulting from the benchmark test procedure. Some embodiments of the IHS may include a reporting module configured to present results of the comparison to a user.

In some embodiments of the IHS, the one or more network file shares may comprise a plurality of network file shares. In some embodiments of the IHS, the given QoS policy may be assigned to the at least one of the one or more network file shares and may have a different priority compared with a given QoS policy assigned to at least one other of the one or more network file shares. In some embodiments of the IHS, the computing module may be further configured to assign the given QoS policy to the at least one of the one or more network file shares. The assignment may be based upon a domain name system (DNS) associated with the at least one of the one or more network file shares.

In some embodiments of the IHS, the computing module may be further configured to assign the given QoS policy to the at least one of the one or more network file shares, the assignment based upon a domain name system (DNS) associated with the at least one of the one or more network file shares. The computing module may be further configured to assign the given QoS policy to the at least one of the one or more network file shares. The assignment may be based upon a given Internet Protocol (IP) address associated with the at least one of the one or more network file shares. The given IP address associated with the at least one of the one or more network file shares may be different from at least one other given IP address associated with at least one other of the one or more network file shares.

In some embodiments of the IHS, the one or more network file shares may communicate with the one or more Network Attached Storage (NAS) servers through one or more Internet Small Computer System Interface (iSCSI) interfaces. The one or more network file shares may communicate with the one or more Network Attached Storage (NAS) servers through one or more Direct-Attached Storage (DAS) interfaces.

Some embodiments are directed to a non-transitory computer readable medium having stored thereon a sequence of instructions which, when loaded and executed by a processor coupled to an apparatus, causes the apparatus to: associate one or more network file shares with one or more Network Attached Storage (NAS) servers; determine a given actual value for a given Quality of Service (QoS) parameter for at least one of the one or more network file shares, through a benchmark test procedure; assign a given QoS policy to the at least one of the one or more network file shares; associate the given QoS policy with the given QoS parameter; and control, at the one or more NAS servers, the given QoS policy. In some embodiments, the given QoS policy assigned to the at least one of the one or more network file shares may have a different priority compared with a given QoS policy assigned to at least one other of the one or more network file shares.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1A:
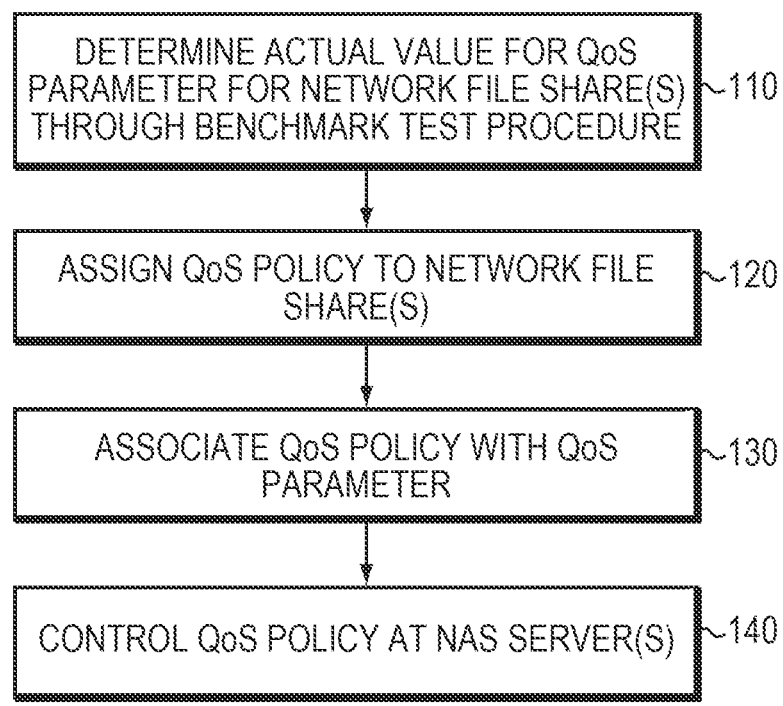
FIGS. 1A-1B are flowcharts directed to handling Quality of Service (QoS) for one or more network file shares associated with one or more Network Attached Storage (NAS) servers, according to some embodiments.

A description of example embodiments follows.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

A Network Attached Storage (NAS) server often may have multiple shares which have different priorities. In existing approaches, a low priority share may consume sufficient bandwidth to adversely affect performance of a higher priority share. In many cases, the file share may be hosted from a cluster of servers, so enabling Quality of Service (QoS) at the share level may help to prevent a file share on one node from consuming too much bandwidth.

Some embodiments may determine what the current throughput is and allows a QoS policy to be set at the share level. Once the maximum throughput is determined, an additional Internet Protocol (IP) address may be assigned to the server representing the share. In the case of active-active clustered nodes accessing the same share, each server may maintain its new IP address, and these IP addresses may be entered in a Domain Name System (DNS), using DNS round robin for load balancing, but is not so limited. QoS may then be configured directly on the server (or at the switch layer) using the predefined IP addresses associated with the given share (and/or each given share).

Existing approaches provide methods for setting a QoS policy at the network layer, but not at the share level. Although some operating systems (such as WINDOWS SERVER) allow performance tuning for shares, the settings are at best set to be the same for all of the shares, and do not allow for prioritizing the shares. For example, a WINDOWS SERVER may have a file system share, and a database share, the database may have high performance requirements, while the file share may hold archive (low priority) data. Copying a large file to the file share may adversely affect performance for the database volume when the same network adapters are used.

Some embodiments may provide Quality of Service (QoS) on a per-share basis for a Network Attached Storage (NAS) server. According to an embodiment, the host server may set (and/or control) one or more QoS parameters for a given NAS share or for each NAS share individually. Some embodiments may be used to prevent an NAS share from consuming an inappropriate amount of bandwidth. As such, some embodiments may avoid the potentially adverse effects on the performance of a higher-priority share caused by use of an inappropriate amount of bandwidth.

By contrast to existing approaches, some embodiments may control bandwidth at the host itself, and therefore does not require a virtual machine for bandwidth control. Another novel feature is that some embodiments may control bandwidth per-share, unlike the per-volume control of existing approaches. Yet another novel feature of some embodiments is the means of bandwidth control. As opposed to existing approaches that merely control at the switch level, some embodiments may control bandwidth at the Internet Protocol (IP) level and/or per individual storage device.

In contrast to other existing approaches which use single host and in which access priority is not set for each individual storage volume, some embodiments may utilize one or more hosts and may control parameters such as bandwidth, throughput, priority, access priority, and/or other types of parameters for each given share individually. Given that some embodiments may control bandwidth at the host itself, some embodiments do not require a virtual machine or a separate entity such as a management computer, in contrast to existing approaches. Another distinct advantage of some embodiments is that they may control bandwidth on a per-share basis, as opposed to existing approaches which control bandwidth on a per-volume basis. Yet another advantage of some embodiments is that they may use interfaces such as, but not limited to, iSCSI and direct attach, as opposed to the Fiber Channel (FC) interfaces of existing approaches.

As mentioned above, some embodiments may handle Quality of Service (QoS) not only on a per-volume basis but also on a per-file-share basis. File shares and volumes may have distinct differences. In some embodiments, a storage device may include a physical drive that has multiple volumes. Also, in some embodiments, a volume may include a "C:" drive or a "D:/" drive. A volume may include, but is not limited to, a New Technology File System (NTFS) volume. A volume may also include one or more directories at the volume/drive level (and/or layer). A file share may include, but is not limited to, a New Technology File System (NTFS) share. A file share refers to a given directory that may be shared at a user level (and/or layer) by two or more users and/or accessed by an individual user.

FIG. 1A illustrates an embodiment 100 of the method (and system) for handling Quality of Service (QoS) for one or more network file shares associated with one or more Network Attached Storage (NAS) servers. Some embodiments may determine a given actual value for a given QoS parameter (including, but not limited to, bandwidth, throughput, transmission delay, availability, priority, access priority, protection, error rate, resilience, jitter, and/or other QoS parameters) for at least one of the one or more network file shares, through a benchmark test procedure 110. Next, some embodiments may assign a given QoS policy (including, but not limited to, a policy to modify one or more of the QoS parameters, and/or another type of QoS policy) to the at least one of the one or more network file shares 120. Then, some embodiments may associate the given QoS policy with the given QoS parameter 130. Further, some embodiments may control the given QoS policy at the one or more NAS servers 140.

Figure 1B:
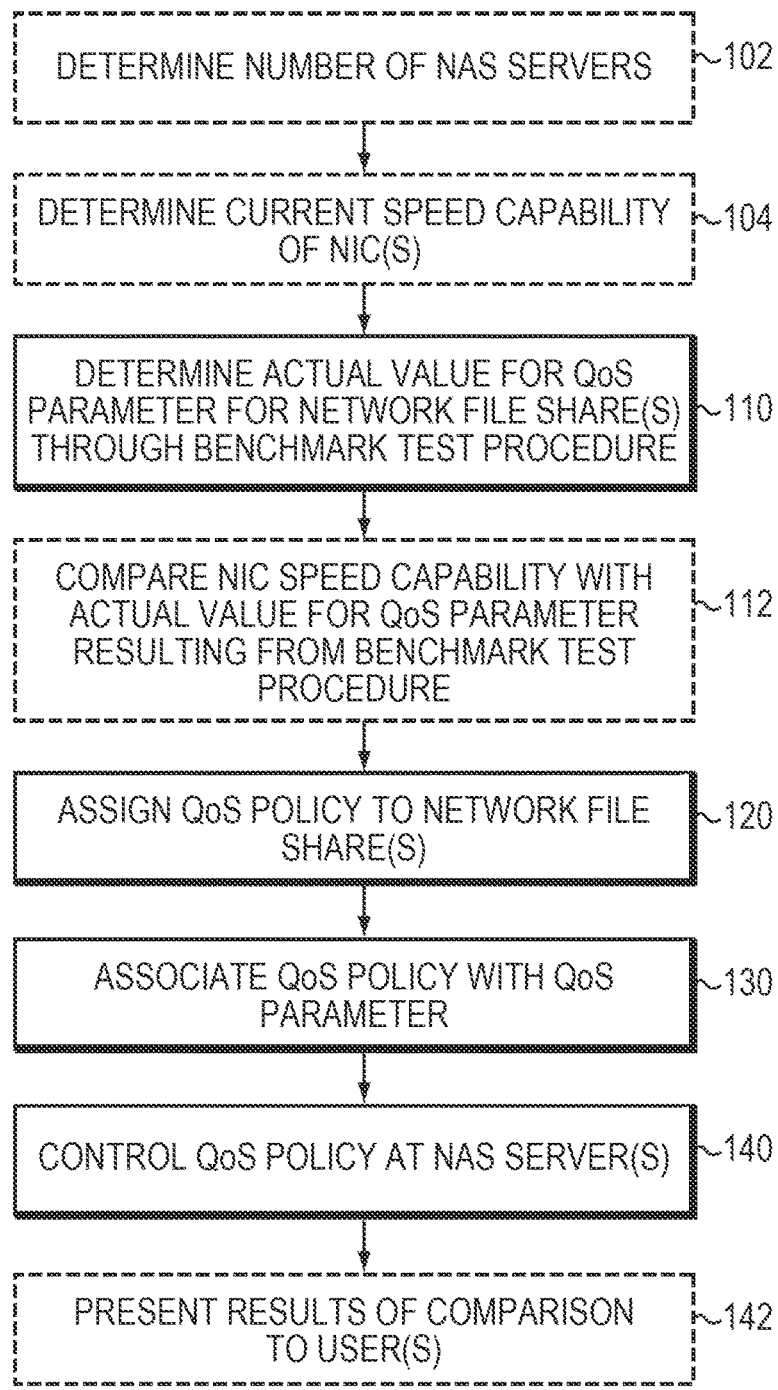

FIG. 1B illustrates an embodiment of a method (and system) 150 that also includes the steps 110, 120, 130, 140 from FIG. 1A. Some embodiments may be an extension of the method (and system) 100 described hereinabove in relation to FIG. 1A. The method (and system) 150 may be applied to any embodiment described herein. Some embodiments may determine a number of the one or more NAS servers 102 and determine a current speed capability 104 of one or more network interface controllers (NICs) associated with the at least one of the one or more NAS servers. Some embodiments may also perform a comparison between the current speed capability of the NICs and the given actual value for the given QoS parameter resulting from the benchmark test procedure 112. Some embodiments may present results of the comparison to a user 142.

The one or more network file shares may comprise a plurality of network file shares. The given QoS policy may be assigned to the at least one of the one or more network file shares having a different priority compared with a given QoS policy assigned to at least one other of the one or more network file shares.

Some embodiments may assign the given QoS policy to at least one of the one or more network file shares. The assignment may be based upon a domain name system (DNS) associated with the at least one of the one or more network file shares. In some embodiments, the given QoS policy may be assigned to at least one of the one or more network file shares. The assignment may be based upon a given Internet Protocol (IP) address associated with the at least one of the one or more network file shares.

In some embodiments, the given IP address may be associated with the at least one of the one or more network file shares and may be different from at least one other given IP address associated with at least one other of the one or more network file shares. In some embodiments, the one or more network file shares may communicate with the one or more Network Attached Storage (NAS) servers through one or more Internet Small Computer System Interface (iSCSI) interfaces. In some embodiments, the one or more network file shares may communicate with the one or more Network Attached Storage (NAS) servers through one or more Direct-Attached Storage (DAS) interfaces.

Figure 2A:
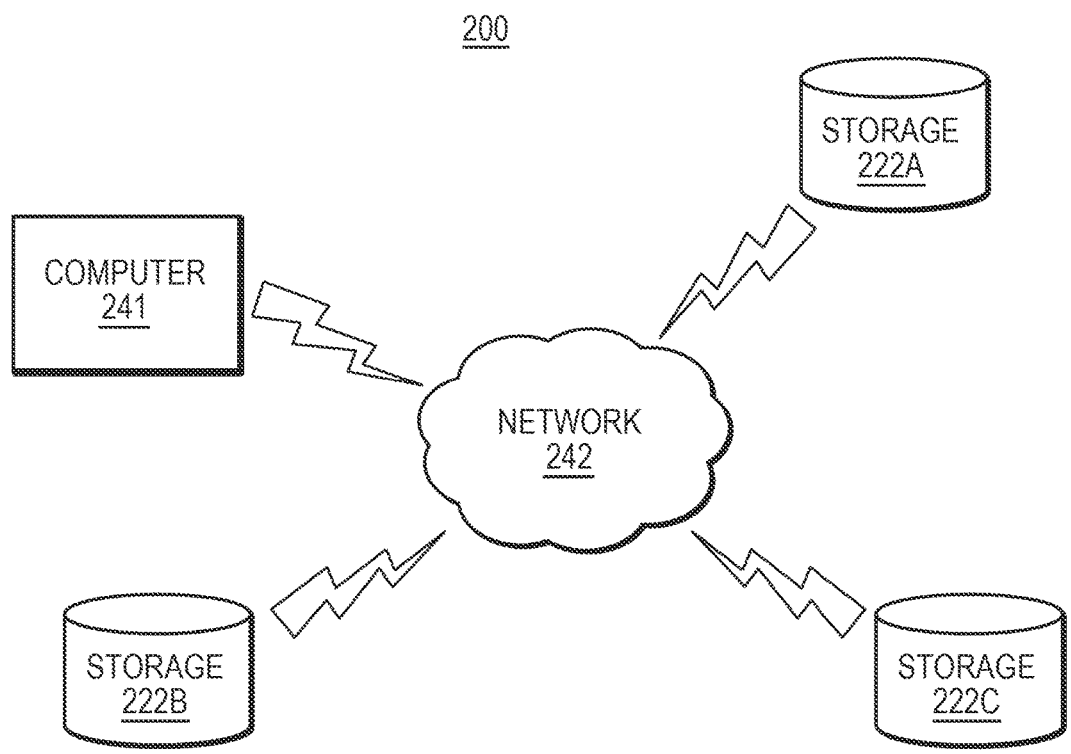
FIG. 2A is a schematic view of a computer network environment in which some embodiments may be implemented.

FIG. 2A illustrates a computer network environment 200 in which some embodiments may be implemented. The computer 241 and the sets 222A, 222B, 222C of one or more storage devices (each one of the sets 222A, 222B, 222C representing one or more storage devices) are linked through network 242. The computer 241 and the sets 222A, 222B, 222C of one or more storage devices may be connected through any network as is known in the art, including a storage area network (SAN), a wide area network (WAN) or local area network (LAN). The computer 241 may embody an information handling system (IHS) 320 (referring to FIG. 3 to follow) and/or any embodiment of the IHS described herein. Similarly, the computer 241 may be configured to carry out any method or embodiment thereof described herein. According to some embodiments, a host computer 241 (and/or NAS server) may be configured to control one or more QoS policies on a per-share basis across the network 242 associated with one or more sets 222A, 222B, 222C of storage devices. While three sets 222A, 222B, 222C of storage devices are depicted, the computer network environment 200 may comprise any number of storage devices.

Figure 2B:
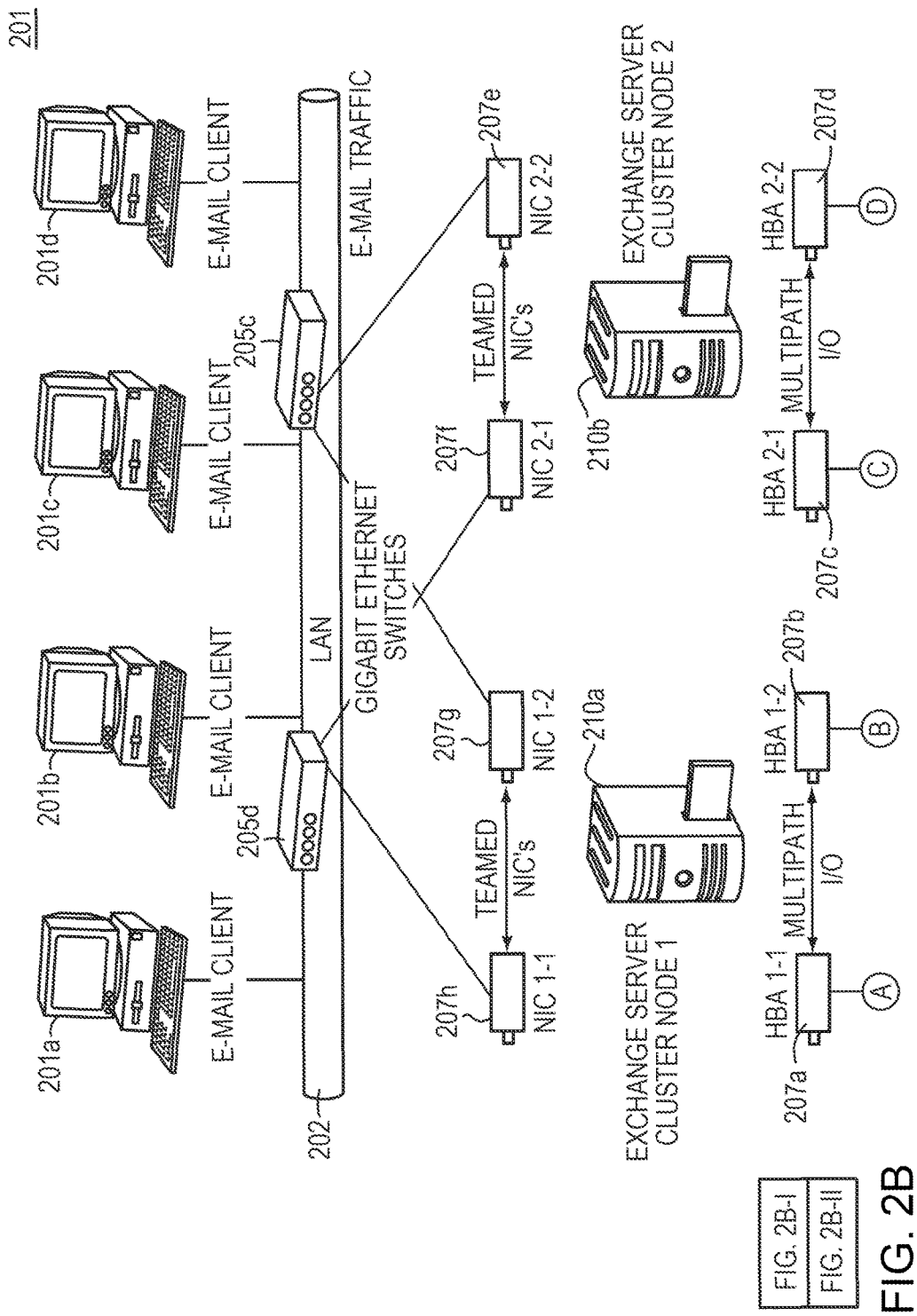
FIG. 2B (FIGS. 2B-I and 2B-II) is a block diagram view of another computer network environment in which some embodiments may be implemented.

As illustrated in FIG. 2B (FIGS. 2B-I and 2B-II), some embodiments may run on a network 201 that may include, but is not limited to, a storage area network (SAN) 203 and a local area network (LAN) 202. The LAN 202 may include components such as one or more clients 201a, 201b, 201c, 201d that communicate through one or more network switches 205c, 205d to one or more network interface cards (NICs) 207e, 207f, 207g, 207h to one or more servers 210a, 210b. The SAN 203 may include, but is not limited to, an Internet Protocol (IP) SAN. The SAN 203 may include components such as one or more servers 210a, 210b that communicate to one or more network switches 205a, 205b through a set of one or more network interface cards (NICs) 207a, 207b, 207c, 207d. Network switches 205a, 205b of the storage area network 203 may communicate to Peer Storage (PS) series arrays 220a, 220b across the SAN 203. Therefore, the SAN 203 may include components such as a PS series group 222 that may include, but is not limited to, storage groups 221a, 221b and PS series data arrays 220a, 220b. The PS series group 222 may include a given set (referring to each of 222A, 222B, and 222C of FIG. 2A) of storage devices. In some embodiments, the SAN 203 may be considered to include the LAN 202 and the above-mentioned components with which the LAN 202 communicates, in addition to the above-mentioned components with which the SAN 203 communicates.

Figure 3:
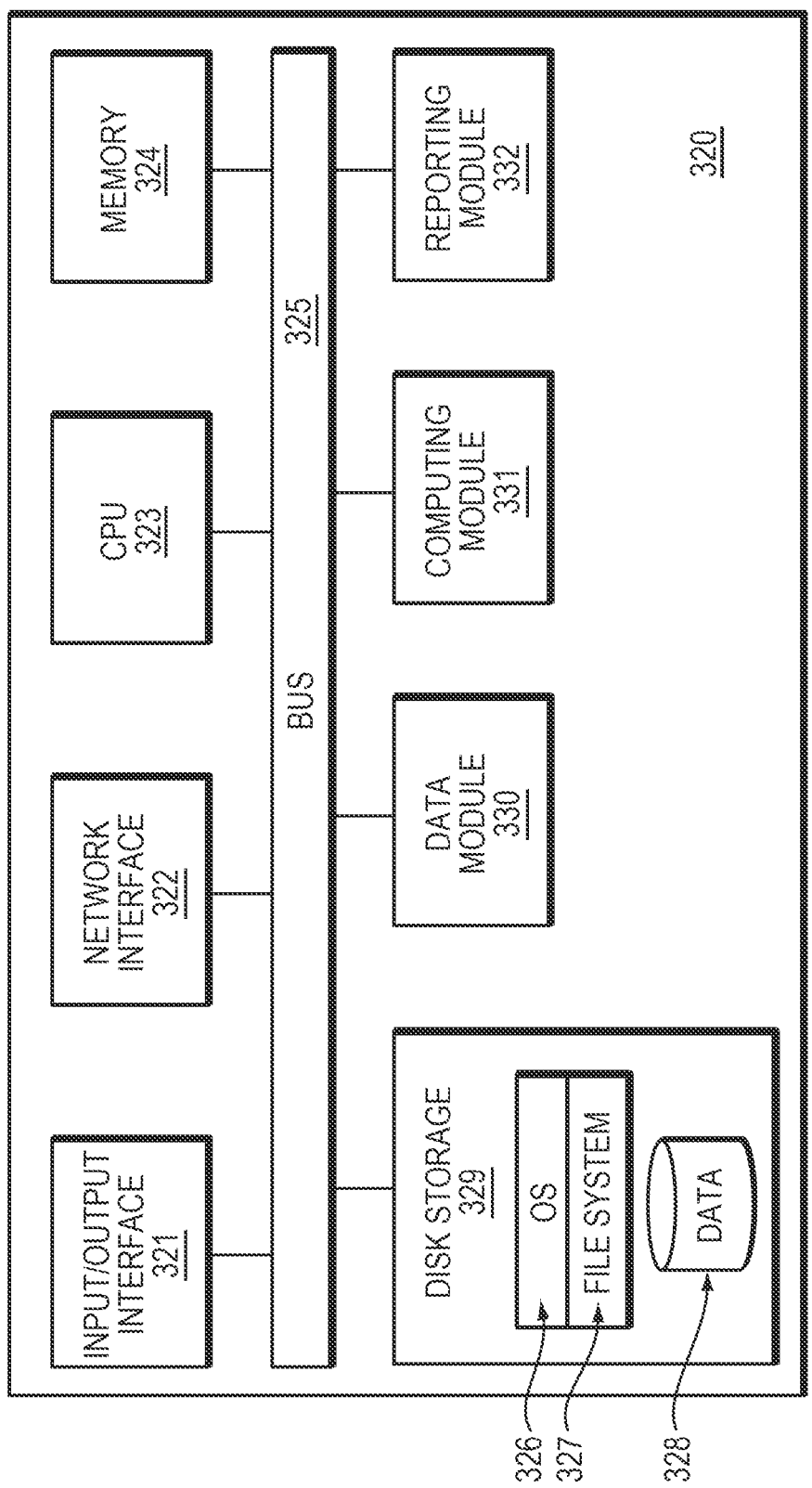
FIG. 3 is a simplified block diagram of an information handling system (IHS) in some embodiments.

FIG. 3 is a high level block diagram of an information handling system (IHS) 320 that may be configured to control one or more QoS parameters in a storage area network on a per-share basis according to some embodiments. The IHS 320 comprises a bus 325. The bus 325 is a connection between the various components of the IHS 320. Connected to the bus 325 is an input/output interface 321 for connecting various input and output devices, such as a keyboard, mouse, display, speakers, etc. to the IHS 320. Further connected to the bus 325 is a network interface 322 for connecting the IHS 320 to the various networks that are known in the art. A Central Processing Unit (CPU) 323 is connected to the bus 325 and provides for the execution of computer instructions. Memory 324 provides volatile storage for data used for carrying out computer instructions. Disk storage 329 provides non-volatile storage for software instructions such as the operating system (OS) 326 and the data 328. Communicatively coupled with the OS 326 is the file system 327. Disk storage 329 may be any storage device known in the art.

The IHS 320 comprises a computing module 331 that may include a first set of one or more storage devices 329. According to some embodiments of the IHS 320, the computing module 331 may be configured to associate one or more network file shares with one or more Network Attached Storage (NAS) servers through the input/output interface 321 or the network 322 via a bus 325. The IHS 320 may also comprise a data module 330 which may be configured to determine a given actual value for a given Quality of Service (QoS) parameter for at least one of the one or more network file shares, through a benchmark test procedure.

The computing module 331 may be further configured to assign a given QoS policy to the at least one of the one or more network file shares through the network interface 322. The computing module 331 may be further configured to associate the given QoS policy with the given QoS parameter. The computing module 331 may be further configured to control, at the one or more NAS servers, the given QoS policy.

In some embodiments, the computing module 331 may be further configured to determine a number of the one or more NAS servers. The computing module 331 may be further configured to determine a current speed capability of one or more network interface controllers (NICs) associated with the at least one of the one or more NAS servers through the network interface 322. The computing module 331 may be further configured to perform a comparison between the current speed capability of the NICs and the given actual value for the given QoS parameter resulting from the benchmark test procedure. Some embodiments of the IHS may include a reporting module 332 configured to present results of the comparison to a user. The data module 330 and/or computing module 331 and/or reporting module 332 may be communicatively coupled to each other as illustrated in FIG. 3.

The data module 330 may be further configured to control a QoS parameter. The data flow may be associated with the one or more QoS parameters that may be located in memory 324. In some embodiments, the data module 330 may be further configured to retrieve and/or update data stored in disk storage 329 to perform the above-mentioned functions. For example, the data module 330 may copy data to and/or from the storage device 329 or via the input/output interface 321 or network interface 322. The data module 330 may copy data to and/or from any communicatively coupled source, including, but not limited to, the computing module 331, the reporting module 332, the network 322, the input/output interface 321, the memory 324, or disk storage 329.

While the various components of the IHS 320 are illustrated in FIG. 3, embodiments of the IHS 320 are not so limited, and as is known in the art, components and modules of the IHS 320 may be connected in a variety of ways, including embodiments wherein one or more components are remotely located. It should be understood by a person of ordinary skill in the art that the IHS 320 may be implemented in various forms. The respective components and modules of the IHS 320 may be combined in any manner that is known in the art and may be implemented in any combination of hardware and software. For example, the above-described components and modules may be executable instructions in memory 324 or Operating System (OS) 326 operated on by CPU 323. Further, the IHS 320 and its various components and modules may be configured to operate in a manner corresponding to the above described method 100, described herein above in relation to FIGS. 1A-1B and their various embodiments.

Figure 4:
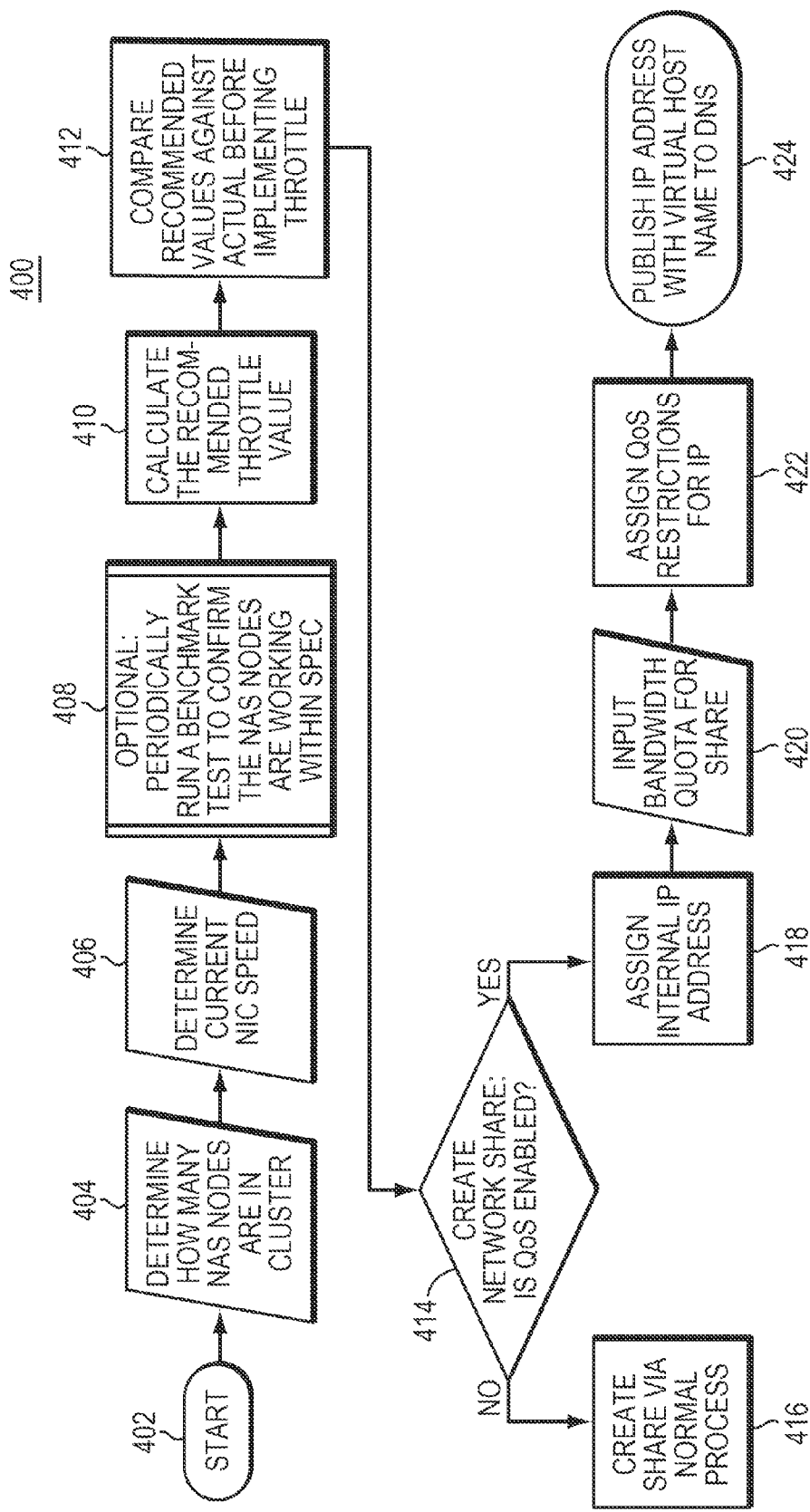
FIG. 4 is a flowchart of a method, according to some embodiments.

FIG. 4 illustrates a flowchart and/or computer-implemented procedure (and system) 400 of some embodiments. Some embodiments may begin 402 by determining a number of the one or more NAS servers (and/or NAS nodes) 404 in a cluster of one or more servers. Next, some embodiments may determine a current speed capability 406 of one or more network interface controllers (NICs) associated with the at least one of the one or more NAS servers. In some embodiments, the current speed capability may be inherent within the Operating System (OS) 326 of FIG. 3.

Next, referring back to in FIG. 4, some embodiments may optionally and/or periodically run the benchmark test 408 to confirm that the NAS nodes are working within specification (e.g., according to the given current NIC speed). In addition, some embodiments may perform a step of calculating actual value of a QoS parameter (such as, but not limited to, throughput) through testing (which may include, but is not limited to, benchmark testing) 410. Some embodiments may determine a given actual value for a given QoS parameter (including, but not limited to, bandwidth, throughput, transmission delay, availability, priority, access priority, protection, error rate, resilience, jitter, and/or other QoS parameters) 410 for at least one of the one or more network file shares, through a benchmark test procedure. Also, in some embodiments, a recommended throttle value may be set by a user 410. In some embodiments, the actual throughput may be set (and/or calculated) 410 through an actual throughput test across the network, or through other means.

Next, some embodiments may perform a comparison 412 between the current speed capability of the NICs determined 406 and the given actual value for the given QoS parameter resulting from the benchmark test procedure 410 (and/or step 408). In some embodiments, a check may be performed to determine whether QoS is enabled 414. If QoS is disabled, some embodiments may create a network share via a standard process 416.

However, if QoS is enabled, some embodiments may assign a given QoS policy (including, but not limited to, a policy to modify one or more of the QoS parameters, and/or another type of QoS policy) to the at least one of the one or more network file shares. Then, some embodiments may associate the given QoS policy with the given QoS parameter. Further, some embodiments may control the given QoS policy at the one or more NAS servers. Some embodiments may assign an IP address 418 internal to the server. In some embodiments, the IP address may be assigned for each given share. Next, some embodiments may assign input bandwidth quota for each given share 420. In some embodiments, a user may provide input to set a throttle value 420. Next, some embodiments may assign QoS restrictions 422 for each given IP address associated with each given share and/or internal to the server. Next, some embodiments may publish each given IP address (in some embodiments, using a Dynamic Domain Name System, or DDNS) with a virtual host name to DNS 424. In some embodiments, a user may virtualize the share and/or its associated IP address 424.

The following examples compare existing approaches with some embodiments, including a comparison of share creation and sharing. Using existing approaches, an example for how a share may be created and shared within MICROSOFT WINDOWS is shown to follow. First, a directory may be created on a hard drive (this may be physically within the server, or connected to remotely via iSCSI or fiber). Share permissions may be granted to the directory, and user security is defined. Users may access the share over the network by choosing the server and share name (e.g., \\server1\share1, \\server1\share2, \\server1\share3). The server "server1" may be resolved via DNS to one or more IP addresses associated with one or more NICs. However, a deficiency of this existing approach is that excessive access to "share3" may impact performance on "share2."

In some embodiments, share based throughput throttling may be implemented within MICROSOFT WINDOWS. A directory may be created on a hard drive (this may be physically within the server, or connected to remotely via iSCSI or fiber). Share permissions may be granted to the directory, and user security may be defined. The user may choose to configure share based QoS. One or more background tests may determine the maximum throughput speed, and present the option for limiting throughput to some percentage of the maximum throughput speed. A virtual IP address may be created and linked to a physical IP address. An additional host name may be defined and associated with the virtual IP address. In some embodiments, share names may include, but are not limited to: \\serve1_1\share1, \\serve1_2\share2, \\serve1_3\share3, etc. QoS settings may be configured for each virtual IP address.

Then, in some embodiments, one or more users may access the share over the network by choosing the server and its respective share name (e.g., \\serve1_1\share1, \\serve1_2\share2, \\serve1_3\share3). The server "server1" may be resolved via DNS to one or more IP addresses associated with one or more NICs. In some embodiments, the following association may be determined between IP addresses and share names, respectively: IP address 192.168.10.10 may be associated with "server1_1"; IP address 192.168.10.11 may be associated with "server1_2"; and IP address 192.168.10.12 may be associated with "server1_3." Some embodiments may remedy the deficiencies of the existing approaches, at least because excessive access to "share3" may be reduced so that there is not a resulting performance impact on "share2."

It should be understood that the example embodiments described above may be implemented in many different ways. In some embodiments, the various methods and machines described herein may be implemented by a physical, virtual or hybrid general-purpose computer, or a computer network environment such as the computer network environments 200, 201. A general purpose computer may be transformed into the machines that execute the methods described above, for example, by loading software instructions into memory or nonvolatile storage for execution by a central processing unit.

Embodiments or aspects thereof may be implemented in the form of hardware, firmware, or software or any combination thereof. If implemented in software, the software may be stored on any non-transient computer readable medium that may be configured to enable a processor to load the software or subsets of instructions thereof. The processor then executes the instructions and may be configured to operate or cause an apparatus to operate in a manner as described herein.

Further, firmware, software, routines, or instructions may be described herein as performing certain actions and/or functions of data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, some embodiments may also be implemented in a variety of computer architectures, physical, virtual, cloud computers, and/or some combination thereof, and, thus, the data processors described herein are intended for purposes of illustration only and not as a limitation of the embodiments.

While this disclosure has been particularly shown and described with references to example embodiments thereof, it will be understood by those skilled in the art that various changes in form and details may be made therein without departing from the scope of the disclosure encompassed by the appended claims. In some embodiments, a share may include a file share and/or a network file share.

What is claimed is:

1. A computer-implemented method for handling Quality of Service (QoS) for one or more network file shares associated with one or more Network Attached Storage (NAS) servers, the method comprising:
   determining a given actual value for a given QoS parameter for at least one of the one or more network file shares, through a benchmark test procedure;
   assigning a given QoS policy to the at least one of the one or more network file shares;
   associating the given QoS policy with the given QoS parameter; and
   controlling, at the one or more NAS servers, the given QoS policy,
   wherein the given QoS policy assigned to the at least one of the one or more network file shares has a different priority compared with a given QoS policy assigned to at least one other of the one or more network file shares.

2. The computer-implemented method of claim 1, further comprising:
   determining a number of the one or more NAS servers, and determining a current speed capability of one or more network interface controllers (NICs) associated with the at least one of the one or more NAS servers;
   performing a comparison between the current speed capability of the NICs and the given actual value for the given QoS parameter resulting from the benchmark test procedure; and
   presenting results of the comparison to a user.

3. The computer-implemented method of claim 1, wherein the one or more network file shares comprise a plurality of network file shares.

4. The computer-implemented method of claim 1, further comprising:
   assigning the given QoS policy to the at least one of the one or more network file shares, the assignment based upon a domain name system (DNS) associated with the at least one of the one or more network file shares.

5. The computer-implemented method of claim 1, further comprising:
   assigning the given QoS policy to the at least one of the one or more network file shares, the assignment based upon a given Internet Protocol (IP) address associated with the at least one of the one or more network file shares.

6. The computer-implemented method of claim 5, wherein the given IP address associated with the at least one of the one or more network file shares is different from at least one other given IP address associated with at least one other of the one or more network file shares.

7. The computer-implemented method of claim 1, wherein the one or more network file shares communicate with the one or more Network Attached Storage (NAS) servers through one or more Internet Small Computer System Interface (iSCSI) interfaces.

8. The computer-implemented method of claim 1, wherein the one or more network file shares communicate with the one or more Network Attached Storage (NAS) servers through one or more Direct-Attached Storage (DAS) interfaces.

9. An information handling system (IHS) comprising:
   a computing module configured to associate one or more network file shares with one or more Network Attached Storage (NAS) servers;
   a data module configured to determine a given actual value for a given Quality of Service (QoS) parameter for at least one of the one or more network file shares, through a benchmark test procedure;
   the computing module further configured to assign a given QoS policy to the at least one of the one or more network file shares;
   the computing module further configured to associate the given QoS policy with the given QoS parameter; and
   the computing module further configured to control, at the one or more NAS servers, the given QoS policy,
   wherein the given QoS policy assigned to the at least one of the one or more network file shares has a different priority compared with a given QoS policy assigned to at least one other of the one or more network file shares.

10. The IHS of claim 9, further comprising:
    the computing module further configured to determine a number of the one or more NAS servers, the computing module further configured to determine a current speed capability of one or more network interface controllers (NICs) associated with the at least one of the one or more NAS servers;
    the computing module further configured to perform a comparison between the current speed capability of the NICs and the given actual value for the given QoS parameter resulting from the benchmark test procedure; and
    a reporting module configured to present results of the comparison to a user.

11. The IHS of claim 9, wherein the one or more network file shares comprise a plurality of network file shares.

12. The IHS of claim 9, further comprising:
    the computing module further configured to assign the given QoS policy to the at least one of the one or more network file shares, the assignment based upon a domain name system (DNS) associated with the at least one of the one or more network file shares.

13. The IHS of claim 9, further comprising:
    the computing module further configured to assign the given QoS policy to the at least one of the one or more network file shares, the assignment based upon a given Internet Protocol (IP) address associated with the at least one of the one or more network file shares.

14. The IHS of claim 13, wherein the given IP address associated with the at least one of the one or more network file shares is different from at least one other given IP address associated with at least one other of the one or more network file shares.

15. The IHS of claim 9, wherein the one or more network file shares communicate with the one or more Network Attached Storage (NAS) servers through one or more Internet Small Computer System Interface (iSCSI) interfaces.

16. The IHS of claim 9, wherein the one or more network file shares communicate with the one or more Network Attached Storage (NAS) servers through one or more Direct-Attached Storage (DAS) interfaces.

17. A non-transitory computer readable medium having stored thereon a sequence of instructions which, when loaded and executed by a processor coupled to an apparatus, causes the apparatus to:
- associate one or more network file shares with one or more Network Attached Storage (NAS) servers;
- determine a given actual value for a given Quality of Service (QoS) parameter for at least one of the one or more network file shares, through a benchmark test procedure;
- assign a given QoS policy to the at least one of the one or more network file shares;
- associate the given QoS policy with the given QoS parameter; and
- control, at the one or more NAS servers, the given QoS policy,
- wherein the given QoS policy assigned to the at least one of the one or more network file shares has a different priority compared with a given QoS policy assigned to at least one other of the one or more network file shares.

* * * * *